June 14, 1932. W. H. NOELTING ET AL 1,863,349
BRAKE CASTER
Filed Oct. 24, 1930
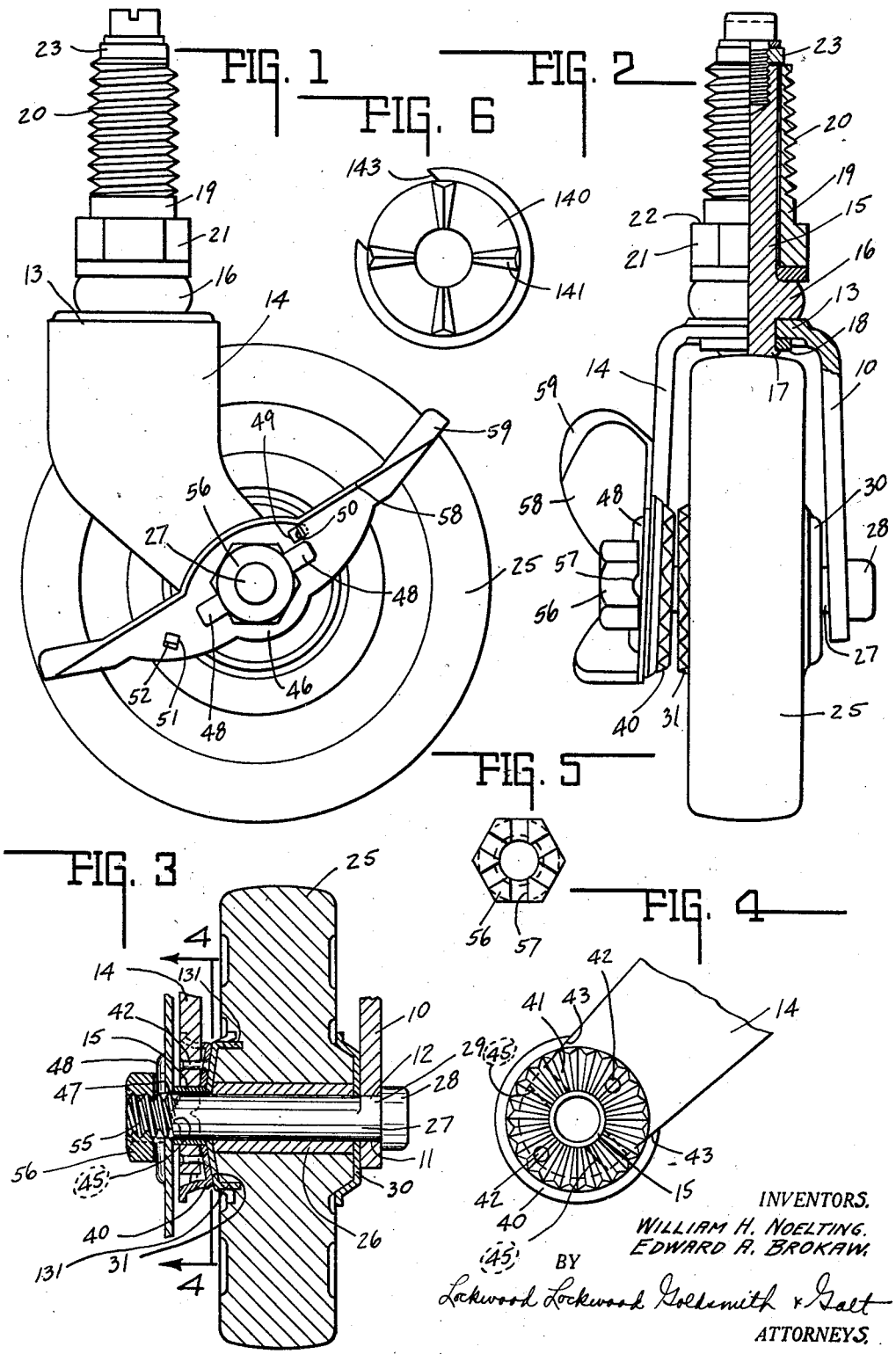
INVENTORS.
WILLIAM H. NOELTING.
EDWARD A. BROKAW.
BY
Lockwood Lockwood Goldsmith & Galt
ATTORNEYS.

Patented June 14, 1932

1,863,349

UNITED STATES PATENT OFFICE

WILLIAM H. NOELTING AND EDWARD A. BROKAW, OF EVANSVILLE, INDIANA, ASSIGNORS TO FAULTLESS CASTER COMPANY, OF EVANSVILLE, INDIANA, A CORPORATION

BRAKE CASTER

Application filed October 24, 1930. Serial No. 490,865.

This invention relates to a brake caster construction.

The chief object of this invention is to provide a brake arrangement for a caster which may be readily operated by the foot of an operator and which construction is particularly adaptable for clamping a caster wheel to its yoke to prevent rolling of a bed, or the like, and in this instance, the invention is particularly applicable for hospital beds.

The chief object of the invention consists in the specific means for locking the caster wheel to the yoke and the control therefor.

The full nature of the invention will be understood from the accompanying drawing and the following description and claims:

In the drawing Fig. 1 is a side elevation of the brake caster embodying the invention and with the foot engageable lever fully exposed. Fig. 2 is a front elevation, a portion of the stem and yoke being shown in quarter-section. Fig. 3 is a transverse sectional view through the caster wheel, yoke and brake construction showing the brake in engaged position. Fig. 4 is a transverse sectional view taken on line 4—4 of Fig. 3 and in the direction of the arrows, certain parts being omitted. Fig. 5 is an inner end view of nut construction associated with the caster wheel bolt. Fig. 6 is a side elevation of a modified form of locking plate.

In the drawing 10 indicates a caster yoke ear having a cylindrical opening 11 and which is enlarged to form a flat portion 12. The ear 10 depends from the yoke portion 13, which also supports a depending ear 14. The depending ear 14 supports one portion of the brake arrangement.

The yoke 13 supports a pintle 15 having an enlargement 16 above said yoke and the enlargement 17 below said yoke, said latter enlargement bearing upon a washer 18, whereby the pintle and the yoke are rigidly united together. The pintle may be of any desired or preferred type and herein the same is shown rotatably supported in a sleeve socket 19, having a threaded exterior 20 with an exposed flange portion 21 shouldered as at 22 for mounting. Associated with the upper end of the tubular sleeve, or socket 20, is a retainer construction 23 which permits pintle rotation in the socket 20 but prevents dropping out of the pintle therefrom.

The wheel 25 may be of any desired construction, such as of the cushion or the hard rubber type and herein it is shown provided with an axle receiving bushing 26. A bolt 27 having the headed portion 28 and the flat or lug portion 29, is seatable in the opening 11 of ear 10, the lug portion 29 co-operating with the flat portion 12 of opening 11. The bolt 27 is seatable in the bushing 26 and forms the axle.

Interposed between the wheel and the ear is a bearing disc 30. This may be of the spring type. Rigidly and suitably secured to the wheel at the opposite side thereof, is a serrated disc 31 having radially arranged wedge like serrations thereon. Lugs 131 may serve as the anchorage.

The other yoke ear 14 supports a bushing 15, which is positioned in the ear opening and extends therefrom and beyond and terminates substantially flush with a complementary radially serrated disc 40, having the radial serrations 41, which disc is rigidly secured to the yoke as by the rivets 42 and which is prevented against rotating by the notch or groove 43, formed in the periphery thereof, which nests or straddles the yoke ear. The serrations on disc 31 are complementary or similar to the serrations 41 on disc 40. The ear 14 includes a diametrical offset portion 45.

An actuating lever includes a plate portion 46, in which is formed an opening 47 through which the bolt 27 projects. Diametrically arranged relative to said opening 47 is the offset portion 48 which in normal operation nestingly receives the offset portion 45 of the ear 14. The yoke 46 has struck therefrom, as at 49, a tongue 50 which serves as a stop and limits tilting movement of the lever in one direction. A similar portion 51 is cut away to form a stop 52 which limits rotation of the lever in the opposite direction.

The bolt is threaded at its free end as at 55 and mounts a nut 56, which has its face adjacent the lever diametrically grooved as at 57 for registration with the diametrically offset portions 48 of the lever. The lever 46 includes the lateral tread portion 58 and said lever extends oppositely in the form of two wings, the edges of which are turned downwardly as at 59 for reinforcement.

Tilting of the lever by stepping on the outermost end 59 will cause the offset portion of the lever to clear the offset portion of the yoke and pass over the same. This causes inward springing movement of the adjacent yoke ear and forces the serrated plate carried thereby toward the complementary plate carried by the wheel and the two are thereupon locked together so that the wheel can not rotate free relative to the yoke.

When the wheel is to be freed, the opposite end of the lever is tread upon which tilts the lever so that its portion 48 again registers with the offset portion 45 of the ear 14. This thereupon permits the resiliency in said supporting ear to spring the ear outwardly which carries with it the ear supported serrated plate and thereby frees the wheel supported serrated plate 31 from the adjacent plate, which permits free rotation of said wheel.

In Fig. 6 is illustrated a modified form of serrated disc. Herein disc 140 includes four transversely and radially arranged radially tapered serrations 141 and cut away as at 143 to straddle the yoke ear.

The invention claimed is:—

1. A brake caster including in combination a yoke, a wheel, a bolt extending through the ears of the yoke and said wheel and pivotally supporting the wheel in said yoke, a clutch member carried by the wheel, a clutch member carried by one of the ears of the yoke, said clutch members being coaxially mounted relative to said bolt, a nut upon said bolt including a plurality of radially arranged grooves upon its inner face, a lever coaxially mounted on said bolt and having an offset seatable in one of said grooves, the clutch supporting ear of said yoke having a similar offset portion, the offset portions being arranged to progressively nest one within the other for free wheeling and for relative offset positioning and clutch engagement for locking the wheel to the yoke.

2. A brake caster including in combination a yoke having two depending ears, the free ends thereof being relatively movable towards and away from each other for braking and free-wheeling respectively, a caster wheel rotatable therebetween, an axle in said ears supporting said wheel, a pair of axially shiftable clutch members, one member being carried by an ear and another member by the wheel adjacent thereto, and coaxially mounted means for shifting said members into engagement and moving axially the free end of the clutch member supporting ear for locking the wheel to the yoke.

3. A brake caster including in combination a yoke having two depending ears, the free ends thereof being relatively movable towards and away from each other for braking and free-wheeling respectively, a caster wheel rotatable therebetween, an axle in said ears supporting said wheel, a pair of axially shiftable clutch members, one member being carried by an ear and another member by the wheel adjacent thereto, and coaxially mounted means for shifting said members into engagement and moving axially the free end of the clutch member supporting ear for locking the wheel to the yoke, said coaxial means including a coaxially mounted lever having an offset portion, and an axle supported co-operating portion adapted to register for free-wheeling and movable apart for braking.

4. A brake caster including in combination a yoke having two depending ears, the free ends thereof being relatively movable towards and away from each other for braking and free-wheeling respectively, a caster wheel rotatable therebetween, an axle in said ears supporting said wheel, a pair of axially shiftable clutch members, one member being carried by an ear and another member by the wheel adjacent thereto, and coaxially mounted means for shifting said members into engagement and moving axially the free end of the clutch member supporting ear for locking the wheel to the yoke, both ears being movable towards and away from the wheels in the braking and free-wheeling action respectively.

5. A brake caster including in combination a yoke having two depending ears, the free ends thereof being relatively movable towards and away from each other for braking and free-wheeling respectively, a caster wheel rotatable therebetween, an axle in said ears supporting said wheel, a pair of axially shiftable clutch members, one member being carried by an ear and another member by the wheel adjacent thereto, coaxially mounted means for shifting said members into engagement and moving axially the free end of the clutch member supporting ear for locking the wheel to the yoke, said coaxial means including a coaxially mounted lever having an offset portion, and an axle supported co-operating portion adapted to register for free-wheeling and movable apart for braking, both ears being movable towards and away from the wheel in the braking and free-wheeling action respectively.

In witness whereof, we have hereunto affixed our signatures.

WILLIAM H. NOELTING.
EDWARD A. BROKAW.